United States Patent [19]

Chausse

[11] Patent Number: 4,631,953
[45] Date of Patent: Dec. 30, 1986

[54] TUBING STRING TESTING DEVICE

[76] Inventor: Leon C. Chausse, P.O. Box 15186, Oklahoma City, Okla. 73115

[21] Appl. No.: 836,348

[22] Filed: Mar. 5, 1986

[51] Int. Cl.$^4$ ............................................. G01M 3/28
[52] U.S. Cl. .................................... 73/49.5; 73/49.1
[58] Field of Search ............. 73/49.5, 49.1, 46, 40.5 R

[56] References Cited

U.S. PATENT DOCUMENTS

3,420,095  1/1969  Brown et al. ..................... 73/40.5 R
4,519,238  5/1985  Hailey .............................. 73/49.5 X Primary Examiner—Howard A. Birmiel
Assistant Examiner—Joseph W. Roskos
Attorney, Agent, or Firm—Edward L. Brown, Jr.

[57] ABSTRACT

A tubing string testing tool having three separate isolated passageways for allowing separate and independent control over the packer or sealing systems as well as for each of two separate testing fluids. The tool is comprised of a plurality of separateable elements that can be connected together to develop the desired length testing tool to correctly position sealing assemblies along the interior of the tubing string to form annular test cavities within the tubing string to isolate joints and tubing wall sections so that a plurality of joints and tubing wall sections can be simultaneously tested. Each of the separate elements include three internal passageway systems and the connection between each employs three separate annular chambers for interconnecting the passageways together between the elements and along the entire length of the tool or along desired portions of that length.

8 Claims, 12 Drawing Figures

TUBING STRING TESTING DEVICE

FIELD OF THE INVENTION

The present invention relates to the method and apparatus for testing the integrity of the walls and connecting joints of a tubing string to determine the presence of leaks in the pipe walls or joints prior to insertion into a bore hole.

BACKGROUND OF THE PRESENT INVENTION

In preparing a string of tubing as it is lowered into a well bore, it is essential to conduct pressure tests of the tubing, including the pipe walls and all connection joints, to determine whether any leaks exist. It is well known to pressure test the connected string of tube sections, and the intermediate joints connecting those sections together by isolating a portion of the tubing through use of a tool inserted into the tubing, by expanding spaced-apart packers and then subjecting the isolated portion between the packers and the tool's exterior to high pressure. Leaks will then be detectable by conventional monitoring equipment used with such testing tools.

The testing tool itself is normally either supported from a cable and inserted into and removed from the tubing between each test, or is allowed to ride within the tubing sections being formed and is pulled upwardly from a lower section that has been tested into a new section mounted on the previous section in order to check the new upper section.

The following U.S. patents illustrate exemplary developments in the art of pressure testing tools:

G. L. Loomis, U.S. Pat. No. 3,154,940
J. C. Chatagnier, U.S. Pat. No. 4,081,990
D. J. Rome, Sr. et al., U.S. Pat. No. 4,083,230

Each shows a type of tubing testing apparatus that includes a single passageway for use with a single testing fluid or liquid and will provide only limited testing capability.

The following patents relate to pressure testing equipment that employs two internal passageways:

E. L. Potts U.S. Pat. No. 2,953,919
G. L. Loomis U.S. Pat. No. 3,165,919
G. L. Loomis U.S. Pat. No. 3,165,920
C. L. Phillips et al U.S. Pat. No. 3,375,703
N. F. Brown et al U.S. Pat. No. 3,420,095
C. F. Phillips U.S. Pat. No. 3,461,961
C. L. Phillips et al U.S. Pat. No. 3,495,443
C. L. Phillips et al U.S. Pat. No. 3,800,596
L. C. Rathburn U.S. Pat. No. 4,468,952

In the early approaches to testing pipes, two separate tools were used. The first was a relatively short tool that would be lowered down into the tubing adjacent a coupling area between two separate tubes. Pressure would be applied to expand sealing devices provided on the tool and spaced axially so as to lie on opposite sides of the coupling. Following the application of a predetermined amount of pressure on those seals, normally in the form of rubber packings, an annular chamber would be formed between the seals, the interior surfaces of the joint and the exterior of the tool. A gas would then be pumped into that annular cavity, such as nitrogen, another pressure would be maintained for some desired period of time at the desired pressure. No gas would be detected if the seal in the joint were sound.

Thereafter, gas pressure would be relieved from the test cavity, the seals would be released and the short tool removed from the pipe. A longer tool would then be inserted into the pipe, this time above the joint just tested, in order to test the integrity of the body of the pipe section above that joint. Here again, the longer tool would be provided with axially spaced-apart upper and lower seals which would be activated in order to again form a cavity between the inner and outer surfaces of the pipe and the tool, respectively, and the seals. Water is normally used to test the integrity of the body of the pipe or tubing and water or other liquid would be pumped into the cavity at a desired pressure.

The short tool would normally be five to ten feet in length and gas would be supplied to the small tool normally through flexible hoses that remained connected to the tool. Such hoses and the tool would be lowered into the tubing together with whatever apparatus was used to support the tool during its insertion and removal.

The longer section would be able to test a pipe having a length of about 25-30 feet, and again the water would be supplied through hoses that remained connected to the longer tool. A device for testing the joint area is shown in Loomis U.S. Pat. No. 3,154,940 and for the wall sections of the pipe in Loomis U.S. Pat. No. 3,165,919.

An improvement in this apparatus was a single device which allowed the testing of two different cavities simulataneously. This was accomplished by using three packer or seal assemblies, two being spaced far enough apart to encompass a coupling area, with the test cavity again being formed about the interior of the coupling. By placing another or third seal some distance from the other two seals, it was then possible to test a long length of pipe after having formed a second cavity between that third and the next closest seal, the outer diameter of the tool and inner diameter of the pipe sections therebetween. An example of such a tool is shown in Brown et al, FIG. 27, U.S. Pat. No. 3,420,095.

To this point the art included testing devices that employed one or two passageways and could test only relatively short pipe sections or a single joint and one length of pipe at a time. They were not capable of testing a multiple number of pipe and joint sections along a relatively long tubing string.

In Hailey, U.S. Pat. No. 4,519,238, the problem of how to create longer testing tools was addressed. The objective there was a tool for testing two or three interconnected pipe sections. In a preferred embodiment, a single longitudinal fluid passageway was used to provide the fluid for setting spaced-apart packers along the tool and to also simultaneously provide the fluid used for testing pipe wall sections. A second longitudinal fluid passageway system provided a second fluid for testing the integrity of pipe joint areas. While Hailey stated that any number of such fluid passages may be provided, including one such passageway for each test chamber in each packer; Hailey also recognized that there were space availability problems for such passageways, as well as connection difficulties which practically limited the number of passageways which could be conveniently used. In another embodiment, Hailey used three internal fluid passageways. The first extended the length of the pipe testing tool and provided pressurized fluid that would set all of the packers and also the fluid necessary for performing controlled tests for certain pipe wall segments. A second passageway extended along a portion of the tool provided a source of pressurized gas that would be directed to joint areas bracketed by the tool that could be separately sealed by packers or seals actuated by the first fluid passageway system. The third fluid passageway extended only from the head end of the tool down into the first annular chamber formed below the uppermost packer or seal. Accordingly, the third passageway was designed to only test one annular chamber. Any other wall sections would be tested by the fluid used to set the packers.

The problem associated with such an arrangement was that it did not fulfill Hailey's stated desire of having more control over the testing device, and indeed it created a potentially dangerous situation by employing the very fluid used to set the packers or seals as used to test the pipe wall integrity. The approach adapted by Hailey to allow this dual use of the packer fluid was to provide an unrestricted radial port to conduct the fluid from that first passageway initially into a setting chamber adjacent to the packers which would set the packers at a predetermined pressure ranging from 1200-2000 psi. A second radial port extended from that same passageway system into the annular chamber that was to be established for testing the pipe wall section once the packers were set. The second port included a restriction or orifice which only allowed pressurized fluid to pass into the annular testing cavity after the packer seals were set, presuming they were quick enough. It was believed that such an approach would assume that the packers would be expanded and fully sealed prior to allowing fluid to enter the annular testing chamber defined between two packers. The problem, however, was that the restriction always remained in the line extending back into the first passageway system and also restricted the decrease in pressure within the annular chamber. Thus, if the seals failed, the restriction would prevent fast depressurization of the annular chamber via the internal cavities and the tool leaving a greater pressure in the annular chamber. Occasionally, tools of this nature could fly out of the tubing string.

Accordingly, it is most desirable to provide three separate passageways within a tool, with each being isolated from the other and extending the full length of the tool. By having the packer control system isolated from the water and gas testing passageway systems, a control over the testing operation and the tool itself will be assured.

SUMMARY OF THE PRESENT INVENTION

The available space within testing tools is extremely limited and makes it very difficult to appropriately design a tool that will have a sufficient number of fluid passageways to develop precise control over test conditions and a connection system that will permit the passageways to extend along the entire length of the tool.

In particular, the string testing tool contemplated by this invention is for testing double or triple sections of pipes and connecting joints without having to remove the tool after each section is tested. Also, the tool is to have each of the fluid systems operating along the length of the tool with each being totally isolated one from the other.

The tool has a head section at the top end including a conventional spear portion that can be grappled by a conventional grappling device in order to elevate the tool from a previously tested string section upwardly into a new pipe section made up thereabove. The head section also includes a male portion connecting area as well as a mounting collar in the form of a tubular sleeve that can be placed over the male section in order to supply the three fluids under pressure to the tool.

The bottom end of the tool is provided with a suitable conventional anchor that will allow the tool to be raised vertically, but prevent the tool from dropping downwardly within the pipe string being tested.

The intermediate portions of the tool are comprised of a mixture of modified separateable tool elements including a bar extension, a sealing assembly, bar members, bar adapter elements and connection element sections.

By appropriately arranging various ones or combinations of such elements, as will be described in detail below, it is possible to make up a tool of whatever desired length and testing configuration as may be needed to test the pipe string and in the most convenient manner. Also, with these elements connected together, three separate isolated passageway systems will be created with each extending as far along the tool as is desired or needed depending upon where testing cavities are required. For example, it is possible to provide five spaced-apart sealing assemblies to develop two water cavities and two gas cavities. Accordingly, two coupling areas as well as the two intervening or adjacent pipes thereabove or below can all be tested simultaneously. In that situation, it is not necessary to have the water passageway extend further than both ends of the second water cavity so the water passageway would not have to extend to the end of the tool. However, if it was desired to have yet a third water cavity below the second gas cavity and above the anchor section, the water passageway could be continued to a point adjacent the very bottom of the tool.

Other objects, features, and characteristics of the present invention, as well as the methods and operation and functions of the related elements of the structure, and to the combination of parts and economics of manufacture, will become more apparent upon consideration of the following description and the appended claims with reference to the accompanying drawings, all of which form a part of this specification, wherein reference numerals designate corresponding parts in the various figures.

DETAILED DESCRIPTION OF THE PREFERRED EXEMPLARY EMBODIMENT OF THE PRESENT INVENTION

Figure 1:
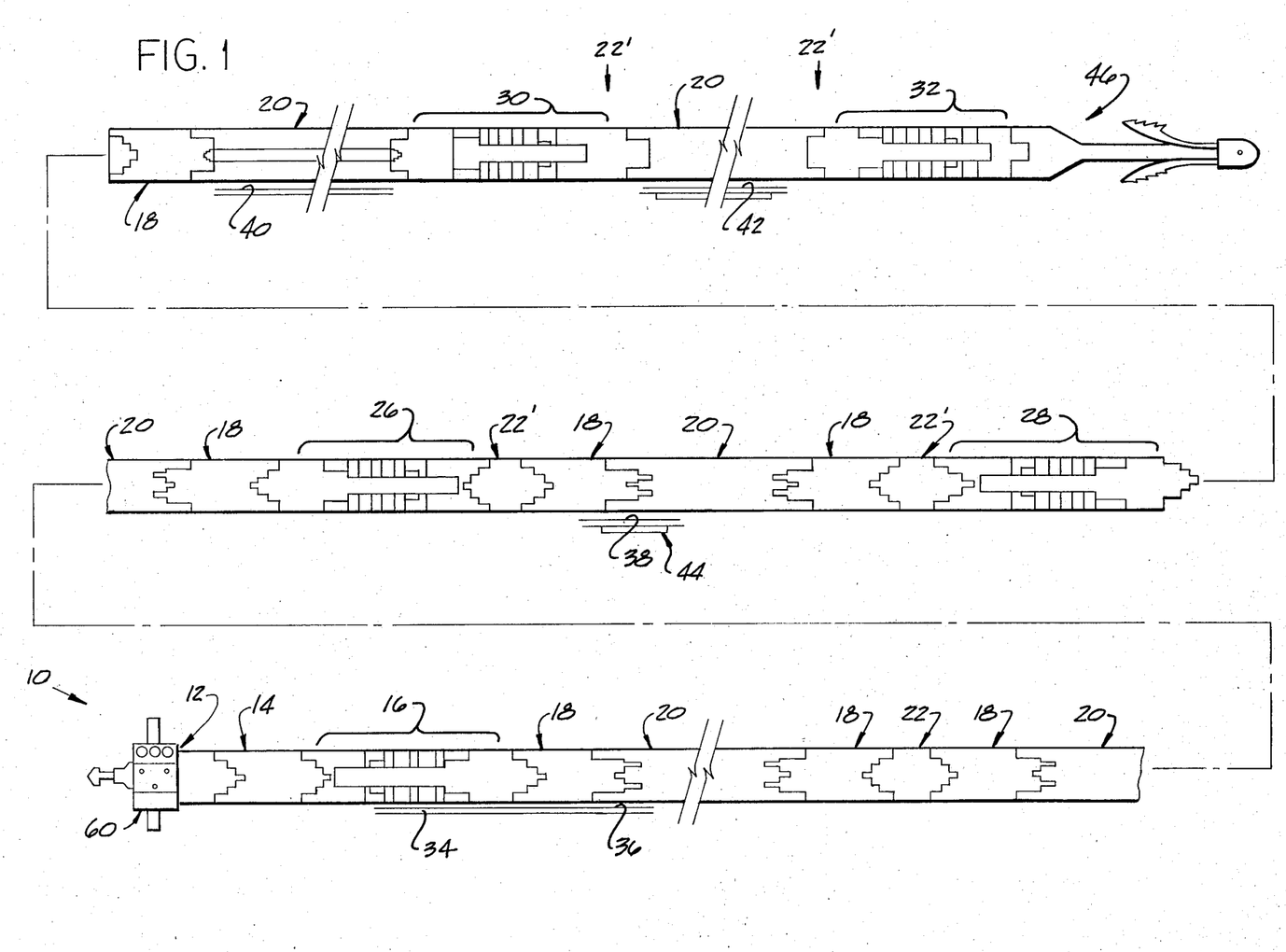
FIG. 1 is a diagrammatic side elevational view of a tubing string testing tool in accord with the present invention with the sections thereof being interconnected as shown by the dot-dash line.

With reference first to FIG. 1, it is evident that the string testing tool 10 described herein is comprised of a plurality of interconnected pieces or elements. These elements include, generally, the head end element 12, a bar extension member 14, a sealing or packer assembly 16, a bar adapter 18, a bar member 20 and a twin pin element 22.

Figure 12:
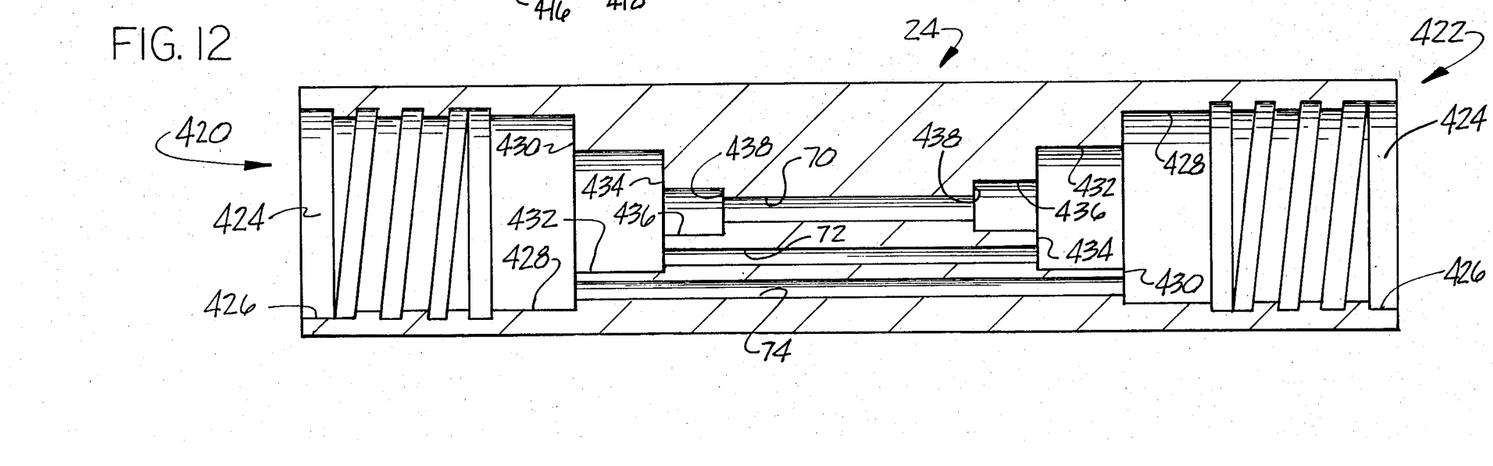
FIG. 12 is an enlarged cross-sectional view of a bar extender having two female ends.

An alternative type of bar extension 24 is shown in FIG. 12 and is provided with two female ends, and should be contrasted with the bar extension member 14.

Figures 10, 11:
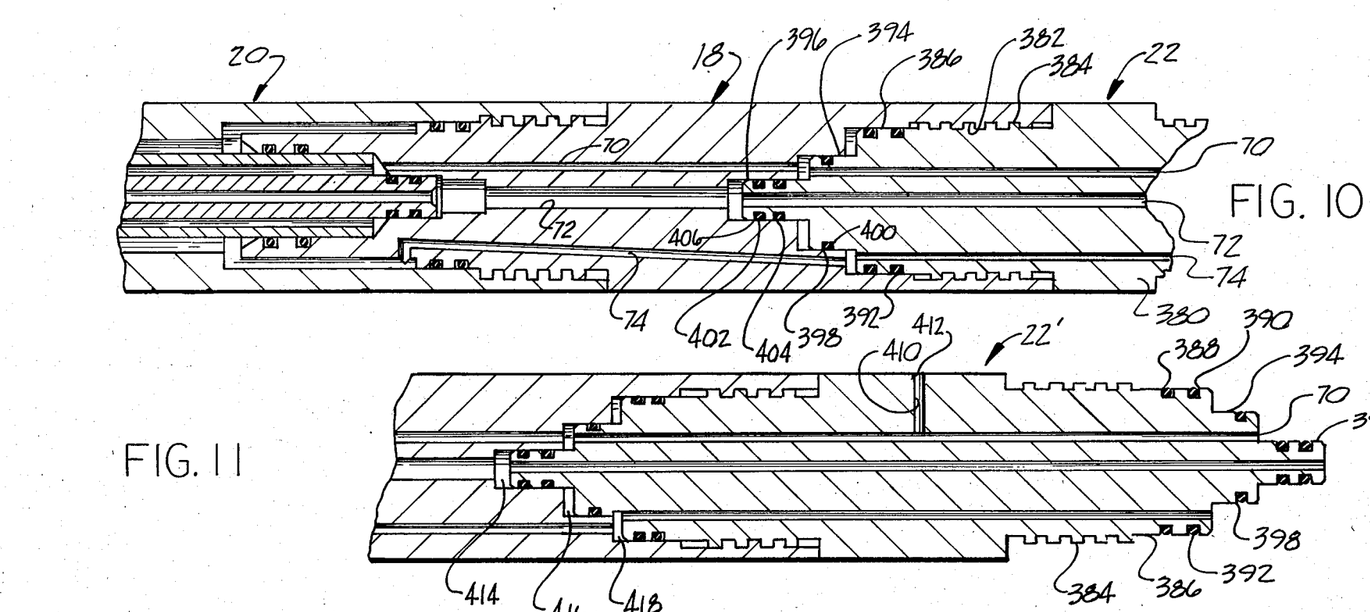
FIG. 10 is a cross-sectional view of the bar adapter portion at the opposite end of the bar assembly from that shown in FIG. 9 together with one form of a twin pin connector element.
FIG. 11 is a cross-sectional view of another form of a twin pin connecting element within the tool according to the present invention.

In the bottommost portion of FIG. 1, the twin pins 22 provided between sealing assemblies 16 and 26 will be constructed as shown in FIG. 10, so that it does not include any radial apertures from any of the internal fluid passageway systems to allow any of the fluids to escape. This is not true, however, with the next two twin pins identified as 22′ located between sealing assemblies 26 and 28 which will have a radial port 410 for the gas, as will be discussed in more depth hereinafter with respect to FIG. 11.

There are five seal assemblies shown in FIG. 1 identified by numerals 16, 26, 28, 30 and 32. The pipe being tested is shown at 34. When these seal assemblies are activated so as to seal between the tool 10 and pipe 34, a plurality of axially extending, annular cavities will be formed as indicated at 36, between seal assemblies 16 and 26; at 38, between seal assemblies 26 and 28; at 40, between seal assemblies 28 and 30; and at 42, between seal assemblies 30 and 32. Annular cavity 36 will have a length suitable for testing a section of tubing and its integrity. The testing fluid can include any conventional testing medium, for example, water. This also can be true with respect to cavity 40. Annular cavities 38 and 42 can be adjacent a joint or coupling, generally indicated by 44, and will include the modified twin pin assembly 22′. The tubing string testing tool 10 can be provided at the bottom end with a conventional anchor 46 such as, for example, the KV8 model manufactured by Guiberson.

Since such an anchor constitutes a piece of conventional equipment, it is not believed that further description thereof is warranted in order to provide a full and complete description thereof.

Figure 2:
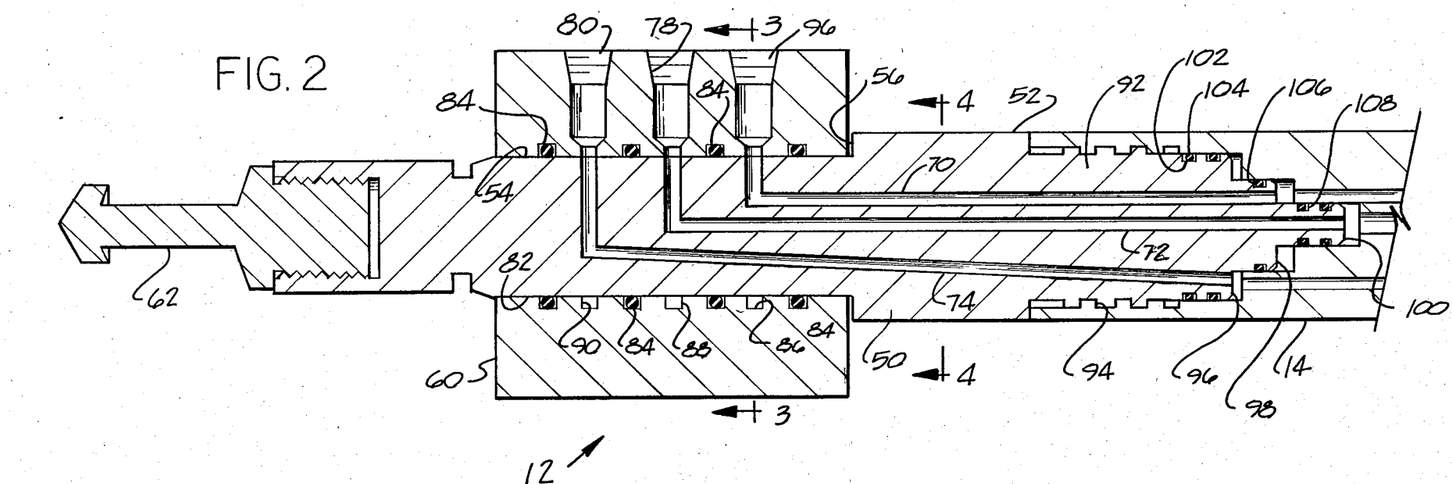
FIG. 2 is a cross-section of the head end of the tool.

Turning next to FIG. 2, the head end 12 includes a main body portion 50 which has an outer sidewall 52 and a circumferentially reduced portion 54 which defines an annular shoulder 56. A connecting collar member 60 is designed to fit over the reduced portion 54 and provide the necessary fluid connection for the two testing fluids and the packer fluid, as will be discussed below. The left end of body portion 50 is provided with a hook member 62 that will cooperate with conventional grappling means (not shown) which together with anchor 46 will allow the entire tool 10 to remain within the tubing string and be raised after a test. After a new portion of tubing is attached, the tool 10 can be lifted by hook 62 to test the next higher portion of the tubing string. In this way, the tool remains within the tubing string between tests, held in place by anchor 46 so the tool is not extracted from the tubing string until all of the testing has been formed on a completed string of tubing.

Main body 50 includes three passageways 70, 72 and 74, with passageway 70 being provided for gas flow to gas cavities that will be formed for testing couplings and joints. Passageway 72 is provided for water to pressure test the tubing sections between the joints, and passageway 74 is provided for packer fluid pressure to control the actuation and operation of the packer or seal assemblies. Connecting collar 60 is provided with three radially extending inlet ports 76, 78 and 80, that respectively allow piping from separate sources of gas, water and packer fluids to be connected to the head end 12 once the tool 10 has been suitably grappled and brought into a position where the head end 12 is exposed above the uppermost tubing section in the newly assembly portion. The interior of collar 60 is defined by a cylindrical bore 82 which includes a plurality of spaced-apart o-ring grooves 84 and associated o-rings as shown are provided so as to seal between annular grooves 86, 88 and 90 which respectively connect with ports 76, 78 and 80 in collar 60, when collar 60 is seated against shoulder 56. Grooves 86, 88 and 90 will form annular chambers once collar 60 is placed over the reduced portion of head portion 50, which in turn connect the fluids to passageways 70, 72 and 74, respectively.

With continuing reference to FIG. 2, body portion 50 terminates at the end opposite from hook member 62 with a male portion defined by a first reduced area 92. The exterior of area 92 is provided with threads 94, such as Acme threads, although other threads such as vee threads or round threads could be used as well as other mounting techniques. That end of body portion 50 is also provided with three-stepped annular shoulders 96, 98 and 100 where the body has been reduced in a stepped fashion. Between the end of threads 94 and shoulder 96, a pair of o-ring grooves 102 are provided in which an o-ring 104 is shown. On the wall, dfined between shoulders 96 and 98, is another o-ring in its circumferential groove 106. Simularly, on the wall defined between shoulders 98 and 100, are a pair of o-rings and grooves 108.

Figure 3:
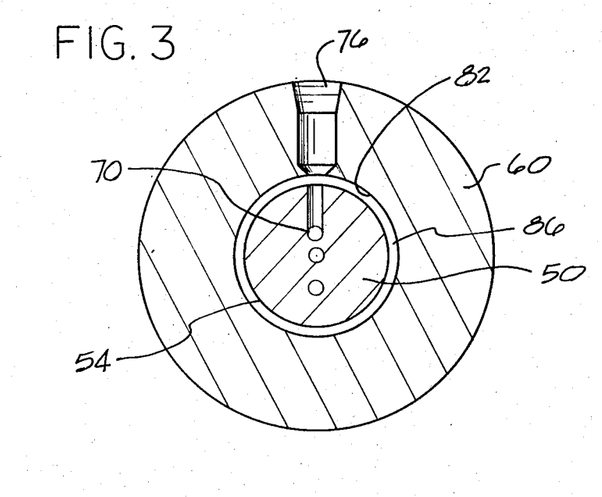
FIG. 3 is a cross-section of FIG. 2 taken along lines 3—3 thereof.
Figure 4:
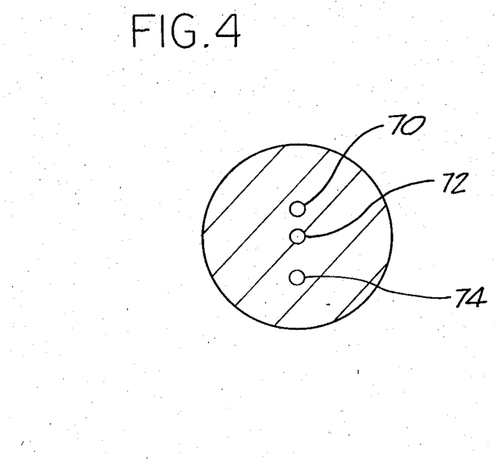
FIG. 4 is a cross-sectional view taken along lines 4—4 of FIG. 2.

FIGS. 3 and 4 show the position of collar 60 with respect to body portion 50 and the relationship between annular groove 86 and port 76. FIG. 4 shows one representation of the positioning and spacing of passageways 70, 72 and 74 within body 50.

Figure 5:
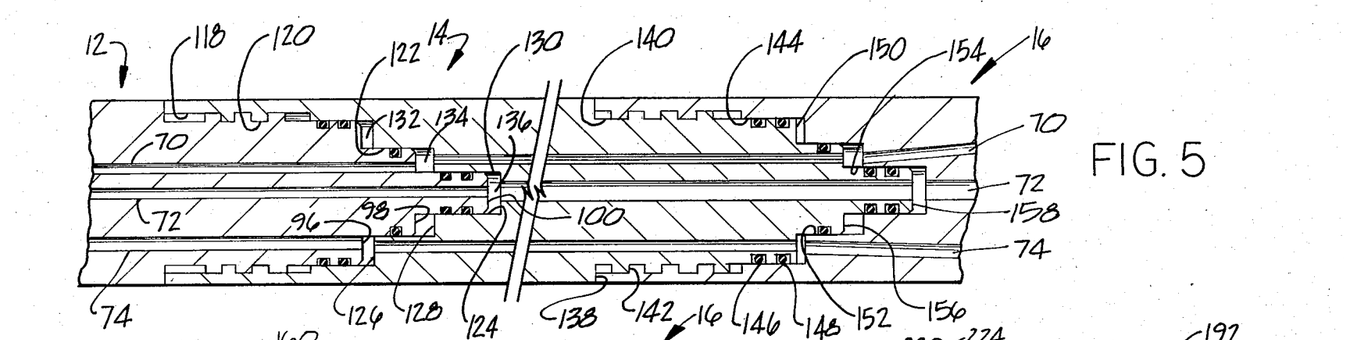
FIG. 5 is a cross-sectional view of a bar extension portion of the tool.

With reference to FIG. 5, bar extension 14 includes a cylindrically shaped, axially extending bore 118 on the left end which is provided with internal threads 120 that will mate with threads 94 on head element 12. Cylindrical bore 118 has a first diameter and two additional concentric bores 122 and 124. Bore 122 has a diameter less than bore 118 while bore 124 has a still smaller diameter than bore 122. Each of these three bored areas are co-axially aligned with shoulders 126, 128 and 130 formed at the base of each, respectively. When head 12 is connected to bar extension 14, shoulder 126 will be directly adjacent and spaced from shoulder 96 of the head element 12, shoulder 128 will be adjacent shoulder 98 and shoulder 130 will be adjacent shoulder 100. Further, the o-rings provided in the o-ring grooves 102, 106 and 108 will seal between these opposing parts of shoulders so that three annular chambers 132, 134 and 136 are formed therebetween and sealed from one another.

As can be seen by comparing FIGS. 2 and 5, passageways 70, 72 and 74, for gas, water and packer fluids extend continuously from the head element into and through bar extension 14, shown in FIG. 5, as well as therebeyond into seal assembly 16. This continuation of those passageways from one element into another is accomplished by the annular chambers 132, 134 and 136, as between head element 12 and bar extension 14. The same annular chamber relationship will be formed between each of the severable elements that together make up tool 10. This provides control over the continuation of the three separate passageways, a variety of elements, a separation between the operating fluids and permits a wide range of tool constructions.

Exemplary of this, and with continued reference to FIG. 5, the other end of bar extension 14 is provided with a first reduced cylindrical area 140 a portion of which, adjacent shoulder 138, is provided with threads 142, the remaining portion comprised of a smooth wall surface 144 in which a pair of o-ring grooves 146 are provided for o-rings 148. Smooth wall surface 144 terminates at shoulder 150, and two other reduced areas 152 and 154 are provided which respectively terminate at and define shoulders 156 and 158 with wall surfaces 144, 152 and 154 again being coaxially aligned. Each succeeding reduced area has a diameter that is smaller than the preceding one thereby forming the stepped configuration, as shown in FIG. 5.

Figure 6:
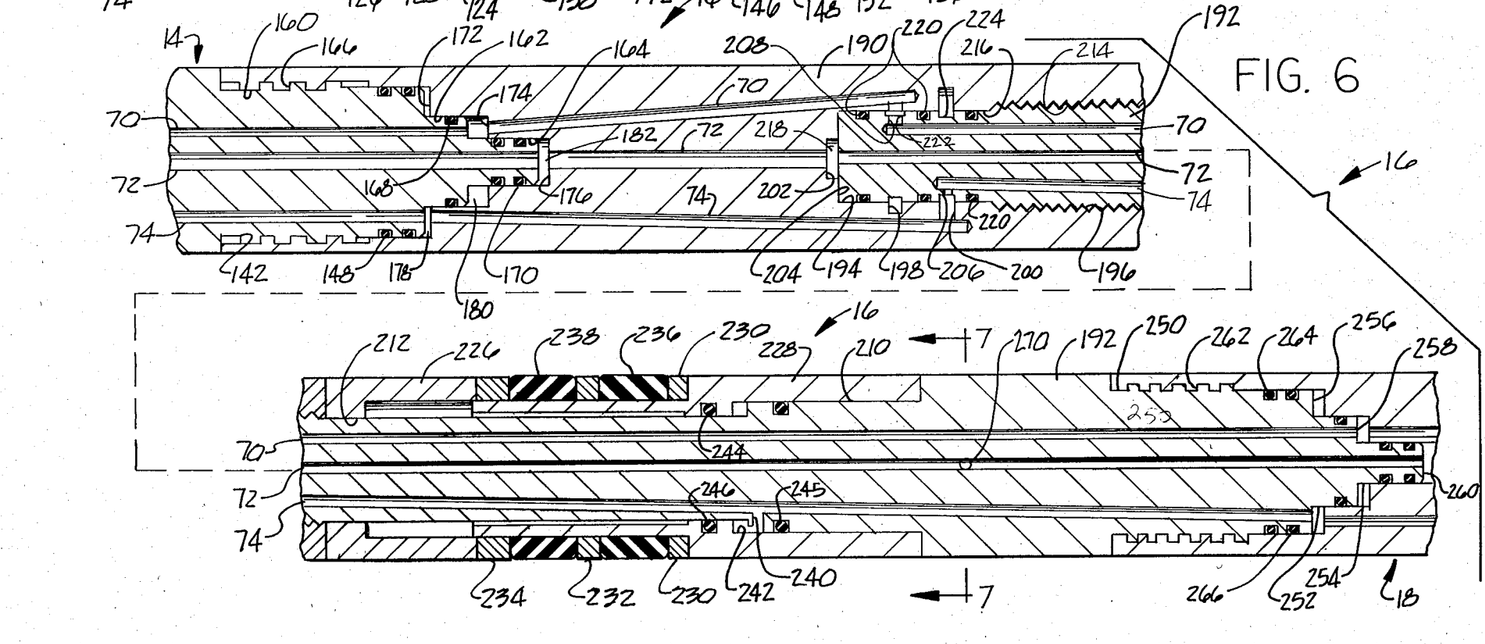
FIG. 6 is a cross-sectional view of the packer assembly portion of the tool.

Turning for the moment to FIG. 6, the left end of sealing assembly 16 includes a cylindrical bore 160 having a first internal diameter, a second bore 162 having an internal diameter less than bore 160, and a third stepped interior bore 164 with an internal diameter less than bore 162. Bore 160 is provided with suitable threads 166 to mate with threads 142 on bar extension 14, referred to above. Bores 162 and 164 each have smooth wall surfaces in order to respectively cooperate with o-rings 168 on wall surface 152 and the pair of o-rings 170 provided on wall surface 154.

Bores 160, 162 and 164 also respectively terminate with bottom walls or shoulders 172, 174 and 176. Between shoulders 150, 156 and 158 and 172, 174 and 176 are defined another series of annular chambers, identified at 178, 180 and 182, respectively. These chambers again provide the connection point between passageways 70, 72 and 74 in bar extension 14, and the same passageways 70, 72 and 74 in sealing assembly 16.

Sealing assembly 16, as shown in FIG. 6, is comprised of two body portions 190 and 192, with body portion 190 including cylindrical bores 160, 162 and 164 in its lefthand end. The right-hand end of body portion 190 is provided with an internal cylindrical bore 194, the outer portion of which is threaded, as indicated at 196. A smooth interior portion of bore 194 is provided with two annular grooves 198 and 200. Groove 200 is milled deep enough to intersect passageway 74 and groove 198 is milled less than groove 200 but deep enough to intersect passageway 70. Passageway 72 extends through the center portion of body portion 190, specifically from shoulder 176 to a small cylindrical recess 202 provided centrally of shoulder 204 at the end of bore 194.

Body portion 192 includes a first reduced cylindrical surface 210 and a second reduced cylindrical surface 212, the outer end of which includes a threaded portion 214 and a smooth unthreaded portion 216 that extends out to an end wall 218. The smooth unthreaded cylindrical portion 216 is provided with a series of o-ring grooves 220 spaced apart axially along that unthreaded portion, as well as two annular grooves 222 and 224 with annular groove 222 connecting into bore 70 and annular groove 224 connecting with passageway 74 via a radial bore 206 and 208, respectively.

Sealing assembly 16 also includes a pot member 226 slidingly received on reduced portion 212 following the placement thereover of a piston 228, together with three compression rings 230, 232 and 234, as well as two rubber seals 236 and 238. The piston seal and pot assembly, as shown in FIG. 6, is believed to be conventional in construction and when operated, rubber seals 236 and 238 will be compressed and move radially outwardly to engage the interior of the tubing string 34 when packer fluid is applied under pressure through passage 74. As will be noted in FIG. 6, there is a radial port 240 provided in the sidewall of passageway 74 that leads to an annular packer chamber or piston cavity 242 which is sealed on each end by the o-ring grooves 244 and 245 in which o-rings 246 are positioned. Once fluid pressure is provided within passageway 74, pressure will be applied within the piston cavity 242 and piston 228 will slide axially along body portion 192 toward port 226 thereby moving the compression rings 230, 232 and 234 toward one another, which in turn, compresses and causes the outward expansion of the rubber seals 236 and 238. This will form a seal between the tool 10 and the interior sidewall of the tubing 34, as seen in FIG. 1. Because passageway 74 is fully isolated from passageways 70 and 72, the seals can be independently maintained and controlled without regard to the pressure conditions in either of those other two passageways, as well as independent of the pressures generated in the test cavities they supply.

The right-hand end of body port 192 of the sealing assembly 16, shown in FIG. 6, is also provided with three stepped cylindrical wall sections 250, 252 and 254 which respectively terminate at end walls or shoulders 256, 258 and 260. Wall section 250 which is reduced from the outer diameter body portion 192 has a rear portion thereof which is threaded, as indicated at 262, with the forward end being smoothed and provided with a pair of o-ring grooves 264, with each including an o-ring 266. Likewise, wall sections 252 and 254 include o-ring grooves and associated o-rings therein, as shown in FIG. 6, in order to provide sealing between mating sections of other elements, as discussed previously.

Figures 7, 8:
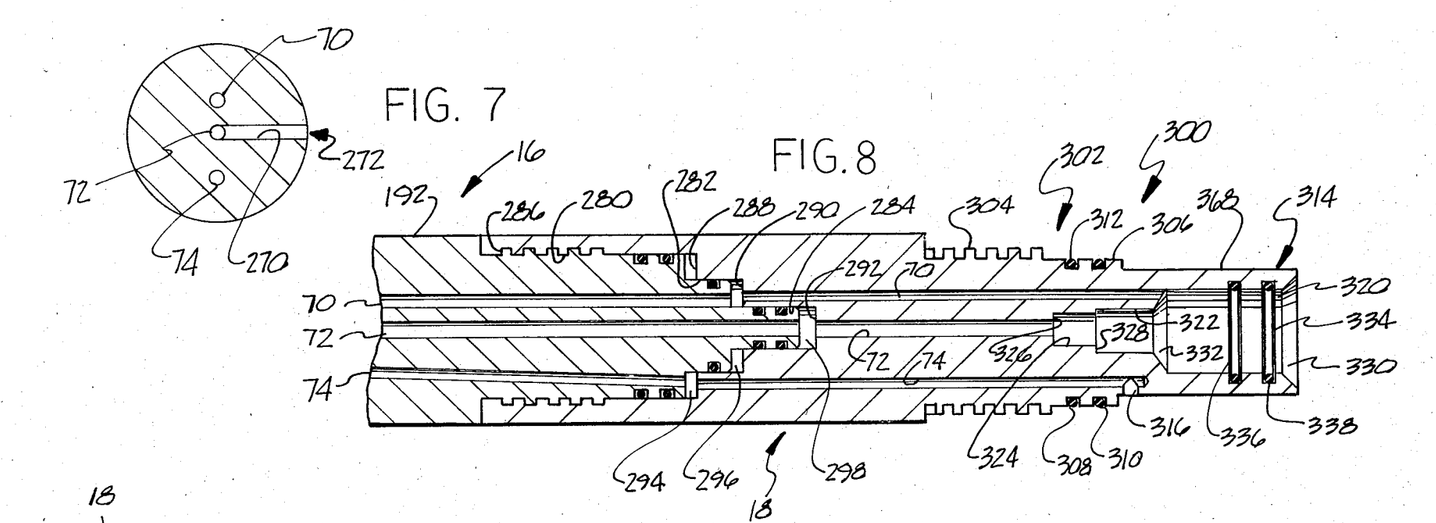
FIG. 7 is a cross-sectional view taken along line 7—7 of FIG. 6.
FIG. 8 is a cross-sectional view of the bar adapter portion of the tool according to the present invention positioned on one side of a bar assembly portion.

The bar element 20 will have a bar adapter 18 provided on each end. As shown in FIGS. 6 and 8, sealing assembly 16 is secured at one end of bar 20 by bar adapter 18. It should be understood that bar 20 is a tool element that can be provided in a variety of long or short lengths in order to accommodate long lengths of tubing so as to space apart seal assemblies for testing long tube portions or short lengths in order to provide only a relatively short separation between sealing assemblies.

With respect to a tubing section between sealing assemblies 16 and 26, water for testing the cavity 36 formed between those two seals once activated is provided thereto by means of an aperture or radial port 270 with an exit 272, shown in FIGS. 6 and 7. Port 270 is drilled through the sidewall of body portion 192 of the sealing assembly 16, so as to be below the seal established by rubber members 236 and 238. Sealing assembly 26 can be identical to sealing assembly 16, but installed within the tool so as to be turned in the opposite direction so that its comparable port 270 will also be positioned between sealing assemblies 16 and 26. Thus, water will be introduced into cavity 36 from each end thereof.

Turning now to FIG. 8, and with reference back to FIG. 6, bar adapter 18 is provided with a left end formed with three stepped internal cylindrical bores 280, 282 and 284. As is noted in FIG. 8, the far left-hand end portion of bore 280 is provided with a threaded portion 286 that will mate with threaded portion 262 of the sealing assembly. The interior portion of bore 280 is smooth so as to cooperate with o-rings 266. Bore 280 terminates at a bottom wall or shoulder 288 and in a similar fashion, bore 282 terminates at an end wall or shoulder 290 with bore 284 terminating at an end wall or shoulder 292. Accordingly, between end walls or shoulders 256, 258 and 260 in the packer assembly and end walls 288, 290 and 292, in the bar adapter 18, three annular cavities 294, 296 and 298 will be formed.

The right-hand end of bar adapter 18, generally indicated at 300 in FIG. 8, is provided with a first reduced cylindrical portion 302, having a threaded portion 304 and a smooth wall portion 306 which is provided with two o-ring grooves 308 and 310 in which o-rings 312 are placed. A second reduced cylindrical portion 314 extends outwardly beyond the reduced cylindrical section 302 and has an outer diameter that is smaller than the outer diameter of cylindrical portion 302. As shown in FIG. 8, the outer sidewalls of reduced portion 314 are smooth and a radial bore 316 is provided through the sidewall thereof which is deep enough to intersect passageway 74. The interior of the right-hand end 300 is provided with three stepped cylindrical bores 320, 322 and 324. The smallest diameter bore 324 terminates at an end wall or shoulder 326, while bore 322 terminates at an end wall or shoulder 328, and bore 320 includes a tapered or beveled outer edge 330 as well as a tapered inner edge 332. Passageway 72 extends through the center part of bar adapter 18 and specifically, from cavity 298, from a point centrally positioned within end wall 292 over to end wall 326. Passageway 70 extends from the shoulder end wall 290 through bar adapter 18 and to the beveled end portion 332 of bore 320. The interior of bore 320 also includes two o-ring grooves 334 and 336 in which o-rings 338 are provided.

Figure 9:
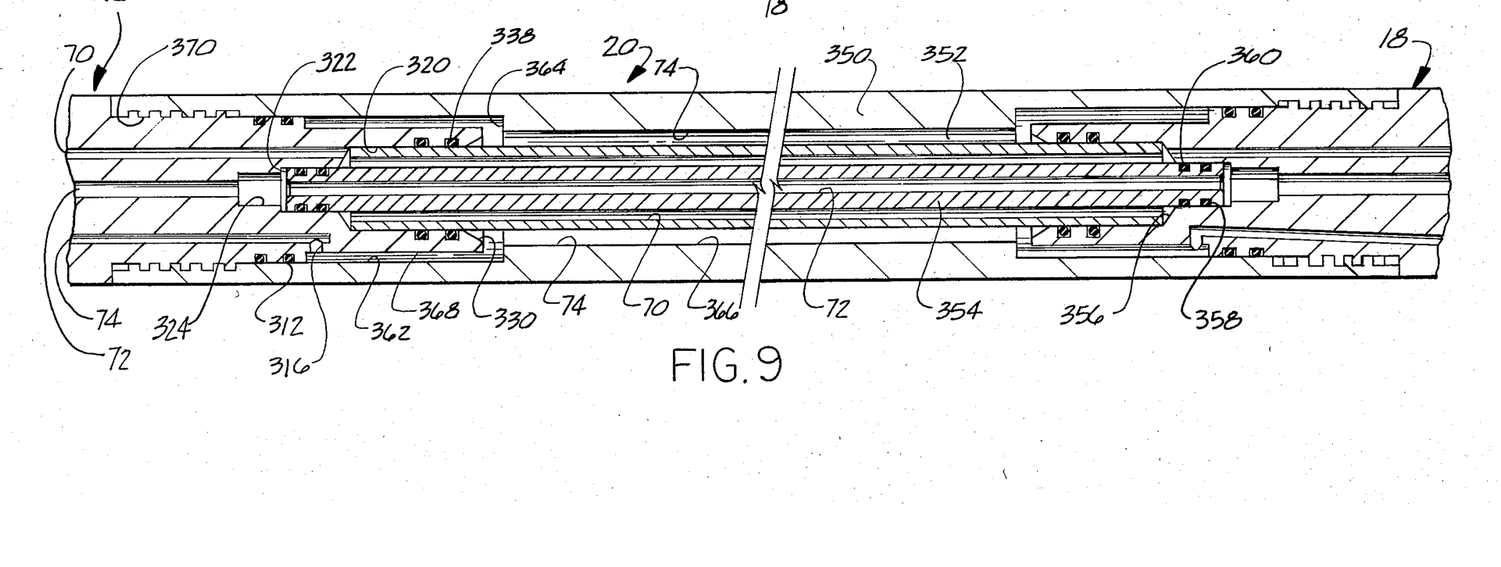
FIG. 9 is a cross-sectional view of the bar assembly portion of the tool.

Turning now to FIG. 9 and bar member 20; this tool element is comprised of three separate pieces, each in the form of a hollow cylindrical section. Included is an outer hollow cylindrical member 350, an intermediate cylindrical sleeve 352, and an inner tubular member 354. The innermost tubular member 354 is provided at each end with two externally positioned, axially spaced-apart o-ring grooves 356 and 358 in which o-rings 360 are provided to seal between its outer sidewall adjacent each end and the interior surfaces of bores 322 provided in each bar adapter 18 removably attached to each end, as shown in FIG. 9.

The outer hollow cylindrical member 350 is provided with an internal bore 362 that terminates at an interior end wall or shoulder 364 which opens into the interior cylindrical surface 366 of member 350. It should be noted as well that both ends of member 350 are formed the same way and will include the same structural arrangement at each end and similarly attached to a bar adapter 18. The outside portion of bore 362 is threaded as indicated at 370 in order to complement the threaded portion 304 of the bar adapter 18. The portion of the bore 362 inwardly of the threaded portion has a smooth wall surface in order to cooperate with o-rings 312 provided on bar adapter 18.

The interior tubular member 354 will have an outer diameter equal to the diameter of bore 322 whereas the intermediate cylindrical sleeve 352 will have an outer diameter equal to the diameter of bore 320. Accordingly, the inner tubular member 354 will fit within bore 322 and its hollow interior communicates with and forms part of passageway 72 through bar member 20.

The intermediate cylindrical sleeve 352 will have an inner diameter that his greater than the outer diameter of the inner tubular member 354 with passageway 70 being defined by the cylindrical chamber formed between the outer surface of the inner tubular member 354 and the inner cylindrical surface of the intermediate cylindrical sleeeve 352 along the length of bar 20. The connection between that cylindrical chamber and passageway 70 in bar adapter 18 is provided through the chamber formed at the end of the intermediate sleeve 352 and the sloped end wall 332 of bore 320. The exterior of the intermediate sleeve 352 and the interior of member 350 form a third cylindrical chamber that also extends along bar 20. That third chamber is connected to and forms part of passageway 74 through bar member 20 via radial port 316 provided in each of the bar adapters 18 at each end of bar member 20 and via a chamber formed between the reduced portion 362 and the outer wall surface 368 of the portion of 314. Since each end of the bar member 20 will be the same, and since the bar adapter 18 connection at each end will be identical, only one end thereof has been described in detail.

In FIG. 10, the bar adapter 18 is shown as being connected to bar member 20 in the manner as just described above with respect to FIG. 9. The right-hand end of bar adapter 18, as shown in FIG. 10, is formed in the same manner as was described previously concerning the right-hand end of bar adapter 18 in FIG. 8. However, rather than being connected to a sealing assembly, it is now connected on its right-hand side to a twin pin 22.

Twin pin element 22, which removably attaches to bar adapter 18, has two ends which are identical, so that only one end, as shown in FIG. 10, will be described. The twin pin element 22 includes a body 380 having a reduced cylindrical section 382 with one portion that is threaded as at 384 and a wall portion spaced axially outwardly of the threaded portion which is smooth as at 386. The smooth portion 386 includes two spaced-apart o-ring grooves 388 and 390 in each of which an o-ring 392 is positioned.

Twin pin element 22 also includes two additional stepped or reduced portions having progressively smaller outer diameters, as shown at 394 and 396. The reduced portion 394 has a smooth outer sidewall and includes an o-ring groove 398 in which an o-ring 400 is positioned.

Reduced portion 396, which has a smaller outer diameter than 394, includes two spaced-apart o-ring grooves 402 and 404 in each of which o-rings, such as the one shown at 406, are positioned. The body 380 also includes internal passageways that connect with passageway systems 70, 72 and 74, as indicated in FIG. 10, in order to continue those passageways throughout the tool. As shown in FIG. 10, the body 380 is not provided with any radial bores or outlets from any of the internal segments of passageways 70, 72 or 74.

The twin pin structure 22 of FIG. 10 can be contrasted with the twin pin shown in FIG. 11 at 22' which is identical except that a radial bore 410 is provided from passageway 70 to the exterior where an exterior entry or exit port 412 is provided. It will be recalled that passageway 70 relates to the gas system so that where twin pin 22' is used an outlet will be provided into the annular chamber formed there around, as for example between sealing assemblies 26 and 28 to allow gas to flow into that annular chamber once sealing assemblies 26 and 28 have been set. With reference back to FIG. 1, sealing assemblies 26 and 28 can be positioned to bracket a connection joint and allow that joint to be checked with gas. Twin pin connectors 22 are positioned adjacent each sealing assembly 26 and 28 so that a gas outlet is provided adjacent each end of the annular chamber formed therebetween. In other respects, twin element 22' remains the same as for the twin pin shown in FIG. 10.

With reference again to FIG. 11, three annular chambers formed at 414, 416 and 418 will provide the connecting chambers between the portions of passageways 70, 72 and 74, as discussed above with respect to the other individual sections. Because this structure is the same as that used on the other end of bar adapter 18, described previously with respect to FIG. 8, further description is not deemed to be warranted in order to provide a full, clear and complete explanation of the connection between the twin pin elements, either that shown at 22 or 22' and associated elements removably secured thereto.

With reference now to FIG. 12, an alternative type of bar extension member is shown having two female ends, generally indicated at 420 and 422. Each end is comprised of a first bore 424 and a second smaller diameter interior bore 428 which is cut forming threads 416. The end of bore 428 defines an end wall or shoulder 430. Another small diameter bore indicated at 432 is next provided with that bore terminating at an end wall or shoulder 434. A yet smaller bore 436 which is co-axially aligned with bores 432, 428 and 424 is provided with that bore terminating at an end wall or shoulder 438. Three internal passageways are also drilled or otherwise formed through element 24, one connecting end walls 438 and corresponding to a continuation of passageway 70. The second connects a passage between end walls 434 and corresponds to the connection portion for passageway 72 with the third passageway connecting end walls 430 and corresponding to a connection portion for passageway 74.

It should be understood that the tool corresponding to the present invention can be constructred from a number of materials primarily including steel, although other materials can be utilized that can be machined and exhibit the structural strength to resist the pressures being used would be applicable. It should also be understood that pressures within the tubing sections where water is being used as a test fluid will have to withstand test pressures in a range of between 1000 psi to 20,000 psi, with the gas also being at similar test pressures.

The tool of the present invention, as for example, can be utilized in small diameter tubing having a 2⅜th inches or 2⅞th inches inside diameter. The outside diameter of the tool in those applications would be a 2¼th inches or 1¾th inches respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tubing string testing tool for testing the integrity of the tubing walls and connecting joints, comprising a plurality of individual, severable, sectional elements that can be combined in numerous combinations, said plurality of elements including a head element, not less than four axially spaced-apart packer elements, and an anchor means element for axially supporting said tool within said tubing string, each of said elements including means defining three separate fluid passage systems, said four axially spaced-apart packer assemblies, when said tool is positioned within said tubing string defining at least first, second and third annular test chambers at three axially spaced-apart locations along said tubing string, said first and third chambers comprising tubing wall test chambers, said second chamber comprising a joint test chamber, said three separate fluid passage systems including a first fluid system connected to each packer assembly for operating said packer assemblies, a second fluid system for providing water test conditions, and a third fluid system for providing gas test conditions, said three fluid passage systems extending from said head element downwardly along and within said tool so that each is isolated from one another and so that each fluid passage system extends downwardly beyond the second of said packer assemblies below said head element.

2. A tubing string testing tool as set forth in claim 1 further including connecting means provided between each of said plurality of elements for providing a separate connection for each of said three fluid passage systems from one element into the next.

3. A tubing string testing tool as set forth in claim 1 further including connecting means provided between each of said plurality of elements to provide a separate connecttion for each of said three fluid passage systems from one element to the next, the connecting means includes a male coupling member with three concentrically spaced different diameter sealing surfaces thereon each terminating in a separate shoulder and each one of the fluid passage systems passing through one of said three separate shoulders.

4. A tubing string testing tool as set forth in claim 1 further including connecting means provided between each of said plurality of elements to provide a separate connection for each of said three fluid passage systems from one element to the next, the connecting means includes a male coupling member with three different diameter sealing surfaces thereon each terminating in an inwardly directed shoulder; and a female coupling member having three mating sealing surfaces thereon each terminating in a separate end wall with each of the three fluid passage systems passing through one of said shoulders of the male member and one of said end walls of the female member.

5. A tubing string testing tool as set forth in claim 4 wherein the adjacent shoulders and end walls are spaced apart defining an annular chamber between the male and female coupling members whereby the connecting fluid passage in the male and female members need not be axially aligned.

6. A tubing string testing tool as set forth in claim 1 further including connecting means between each of said plurality of elements for providing separate connection for each of said three fluid passage systems from one element into the next including a male coupling member with three concentrically spaced different diameter sealing surfaces thereon each terminating in a separate shoulder and each one of said fluid passage systems passing through a separate shoulder, said largest diameter sealing surface including threads adjacent thereto and the female portion of the coupling comprising three separate different diameter tubes with the inside diameters thereof mating with the three sealing surfaces of the male coupling member, and the largest diameter tube having threads thereon for receipt of the threads on the male coupling member.

7. A tubing string testing tool as set forth in claim 1 further including connecting means provided between each of said plurality of elements to provide a separate connection for each of said three fluid passage systems from one element to the next, the connecting means comprising a combination male-female member including a first sealing surface on the outside thereof, and second and third sealing surfaces of progressively less diameter on bores inside said member, the coupling member to the male-female member comprising three separate different diameter tubes with the inside diameter of the largest tube mating with the said first sealing surface and the outside diameter of the second and third tubes mating with said second and third sealing surfaces.

8. A tubing string testing tool for pressure testing the integrity of the tubing walls and connecting joints comprising a plurality of interchangeable elements including at least a head element, not less than four packer elements and an anchor element; all of the elements including three separate fluid passageway systems and a universal coupling between at least two elements comprising: a male coupling element having three different diameter sealing surfaces thereon, each terminating in an inwardly directed shoulder; one of said sealing surfaces including thread means adjacent thereto, each one of the three fluid passageway systems passing through one of said three shoulders of each of the sealing surfaces; a female coupling element comprising three separate tubes of different diameter with each tube having an inside diameter sealably mating with one of said sealing surfaces on the male element, one of said tubes including thread means to engage the thread means of the male coupling element.

* * * * *